| | | |
|---|---|---|
| | | [11] 3,989,493 |
| Barron | | [45] Nov. 2, 1976 |

[54] METHODS FOR MAKING A FIBER OPTIC DISPLAY DEVICE

[75] Inventors: Colin Barron; Stephen John Turpin, both of Leeds, England

[73] Assignee: The Rank Organisation Limited, London, England

[22] Filed: Feb. 26, 1974

[21] Appl. No.: 446,100

[30] Foreign Application Priority Data

Feb. 26, 1973  United Kingdom.................. 9363/73

[52] U.S. Cl. ..................................... 65/2; 240/10 P
[51] Int. Cl.² ........................................... G03B 37/00
[58] Field of Search............... 240/1 LP, 10 L, 10 P, 240/2 D, 2 W, 4, 10.1; 350/96 B; 65/64, 63, 2, 4, DIG. 7

[56] References Cited
UNITED STATES PATENTS

| 333,727 | 1/1886 | Campbell ........................... 240/10 P |
|---|---|---|
| 2,935,598 | 5/1960 | Dempsey ................................. 240/4 |
| 3,431,410 | 3/1969 | Dolan et al..................... 240/10 L X |
| 3,609,343 | 9/1971 | Howlett............................. 240/10 L |
| 3,735,113 | 5/1973 | Stott............................. 240/10 L X |
| 3,758,285 | 9/1973 | Knowlton ....................... 240/10 P X |
| 3,803,398 | 4/1974 | Walker.............................. 240/10 L |

*Primary Examiner*—Fred L. Braun
*Attorney, Agent, or Firm*—Brisebois & Kruger

[57] ABSTRACT

A display device is formed from a fiber optic bundle by stripping a portion of the sheath from the bundle and thereafter twisting the exposed fibers together, heating the fibers to form a permanent bend therein and then applying a shock to the fibers to untwist the same. In an alternative method, the stripped fibers are spread into a desired pattern by an oscillating pin and an adhesive applied thereto to retain the fibers in the pattern formed by the pin.

3 Claims, 15 Drawing Figures

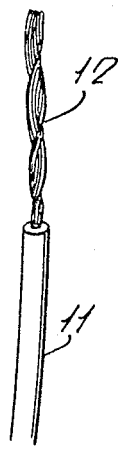
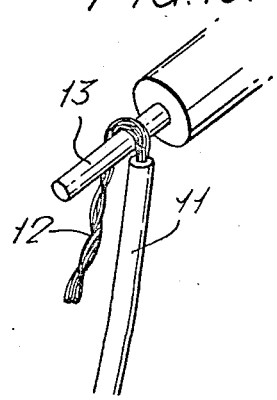
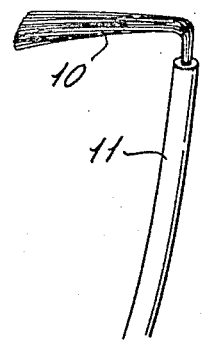
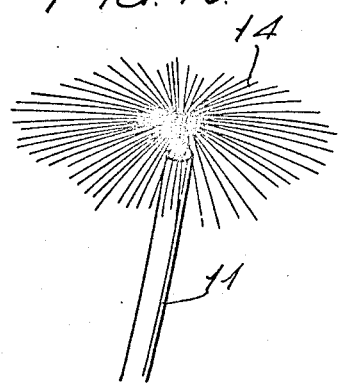
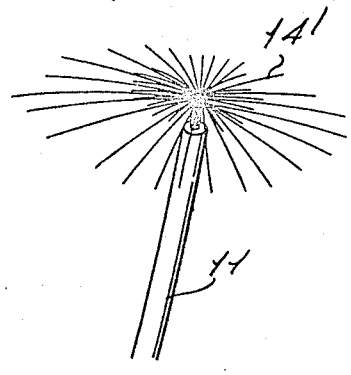

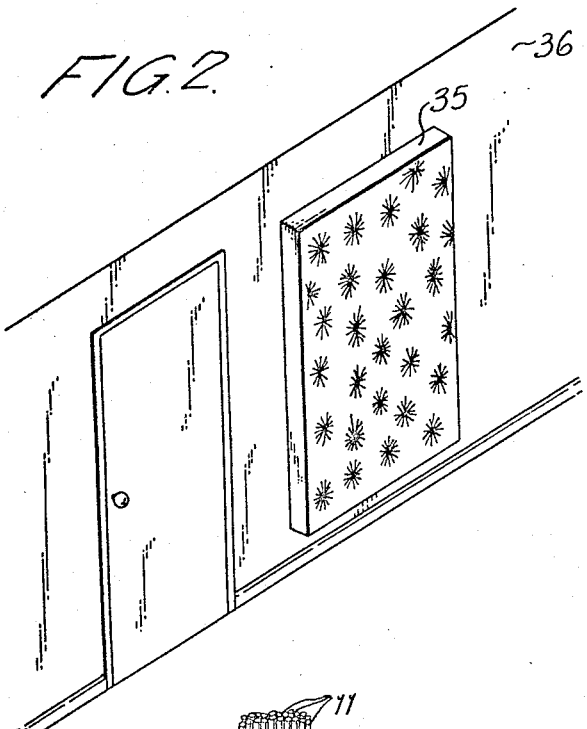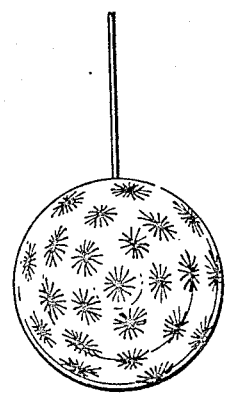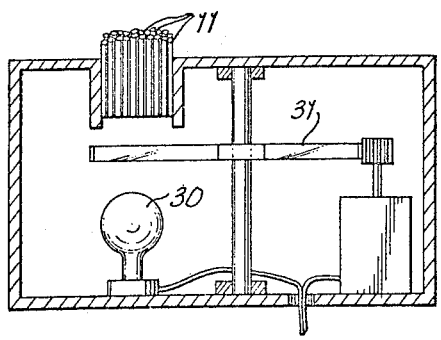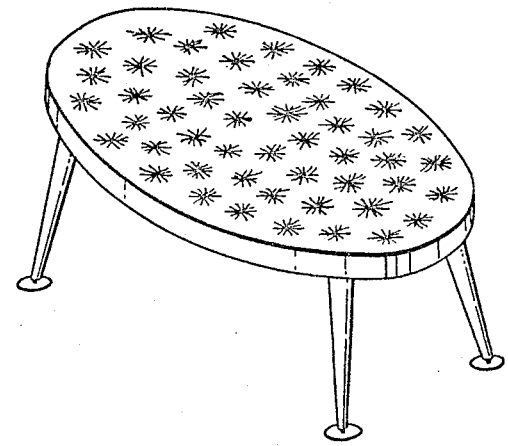

METHODS FOR MAKING A FIBER OPTIC DISPLAY DEVICE

FIELD OF THE INVENTION

This invention relates to a display device.

Fibre optic displays are usually of the well known "mares tail" form, giving a display in three dimensions. Such displays have limited applicability, and it is an object of the invention to provide a display of different form.

BRIEF SUMMARY OF THE DEVICE OF THE INVENTION

According to one aspect of the invention, there is provided a display device comprising a sheathed fibre optic bundle comprising a plurality of fibres which at one end of the bundle are stripped of the protective sheath, separated and radiate from the end of the bundle substantially in a single plane, whereby to form a rosette or segment thereof, a light source for illuminating the other end of the bundle, and transparent protective means for the rosette.

The invention thus provides a planar display, and this has a wide range of applicability, for example to decorate table tops, wall or ceiling panels or the like.

FURTHER FEATURES OF THE INVENTION

Usually a plurality of rosettes will be distributed under a single protective plate or shield, such as a glass table top or panel. Further, a plurality of rosettes can be accommodated behind the inner surface of a transparent sphere or the like, whereby to provide a suspended display.

A conventional tungsten halogen light source may be employed, in conjunction with a dichroic reflector which directs the light through a rotatable colour filter, as is known for mares tail displays.

The rosettes may be held between a transparent cover and dark-coloured backing plate in order to provide maximum contrast in use.

BRIEF SUMMARY OF ONE METHOD OF THE INVENTION

According to another aspect of the invention, there is provided a method of producing a display device according to which the fibres at one end of a fibre optic bundle are twisted, the twisted length at a point adjacent the said end of the bundle is bent over an element heated sufficiently to give the fibres a permanent set bend after removal of such element, and the fibres are then given a jolting movement to untwist them, whereby to cause the fibres to radiate from the said end of the bundle substantially in a single plane, whereby to form a rosette or segment thereof. Some of the radiating fibres may be shortened to provide a double rosette. The rosettes are incorporated into a display device including a light source for illuminating the other end of the bundle and transparent protective means for the rosettes.

BRIEF SUMMARY OF SECOND METHOD

According to another aspect of the present invention, there is provided a method of producing a display device according to which the stripped end of a sheathed fibre optic bundle is supported by securing the adjacent end of the remainder of the sheathed bundle in an apertured support, a pin-shaped element is inserted into the fibres at the stripped end and is oscillated to spread the fibres into a rosette lying substantially in a single plane against the apertured support, a ring-shaped member is applied over the pin to hold the spread fibres against the support, the pin is withdrawn, a fast air-curing adhesive is applied to the fibres at the centre of the rosette, and after curing said adhesive the ring is withdrawn.

BRIEF DESCRIPTION OF DRAWINGS

The following may be instanced as a practical example of the invention with reference to the accompanying drawings, in which:

FIGS. 1a to 1f show one method of manufacturing the display device according to the invention and FIG. 1f shows an optional further step;

FIGS. 2 to 4 show alternative forms of display device;

FIG. 4A is a schematic view showing means for illuminating a display device.

DESCRIPTION OF EMBODIMENTS

Figure 5A:
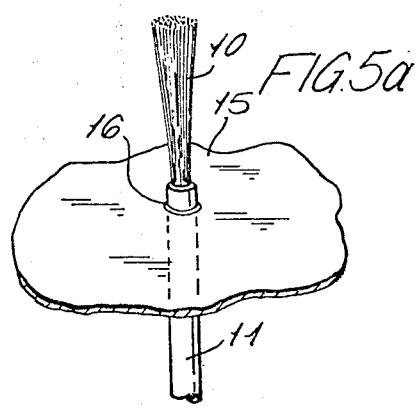
FIGS. 5a to 5e illustrate an alternative method of manufacturing the display device.

A conventional fibre optic bundle (see FIG. 1a) consists of a plurality of fibres 10, for example about 400, each about 50 microns in diameter, encased in a sheath 11, for example of polyvinyl chloride. As a preliminary step (see FIG. 1b), the sheathing 11 is stripped from a two inch length at one end of the bundle. The exposed fibres 10 which project are then twisted. As shown in FIG. 1c, the twisted length 12, at a point near the cut end of the sheath 11, is placed over and bent round a hot bar or rod 13, for example for about 5 to 10 seconds depending on the exact temperature of the bar or rod, which is sufficient to cause the fibres 10 to soften and, upon cooling when the bar or rod 13 is removed, to take a permanent set bend (see FIG. 1d). The twisted and bend-set fibres are jolted or flicked after cooling, whereby the fibres automatically untwist and spread into a rosette 14 (see FIG. 1e) wherein the individual fibres radiate from the end of the bundle substantially in a single plane. Some of the fibres may be shortened, as shown in FIG. 1f, if desired, whereby to form a double rosette 14[1].

A plurality of rosettes may be incorporated in any one of a number of different display devices, such as table tops or wall and ceiling panels. For this purpose, the rosettes are sandwiched between a glass cover plate 35 (FIG. 2) and a dark-coloured, e.g., matt black backing plate 36. As is conventional in mares' tail displays and shown in FIG. 4A, the ends of the bundles 11 remote from the rosettes are illuminated from a tungsten halogen light source 30 through a rotating colour filter 31, whereby the rosettes show changing colours, either all the same colour or different colours simultaneously, dependent on the arrangement of the colour filter. Refinements are possible to synchronise the changing colours with other circumstances of the environment, such as the music being played by a record player.

FIGS. 2 to 4 illustrate the display device invention. In these figures, FIG. 2 shows a wall panel incorporating planar rosettes, FIG. 3 a suspended sphere and FIG. 4 a coffee table.

Figure 5B:
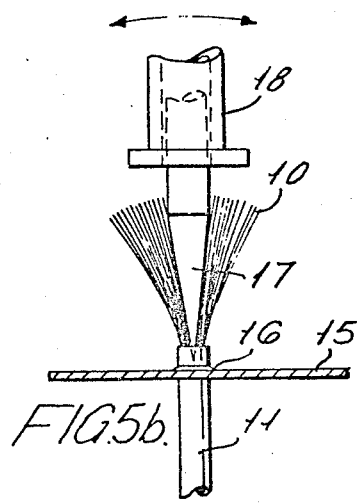
Figure 5C:
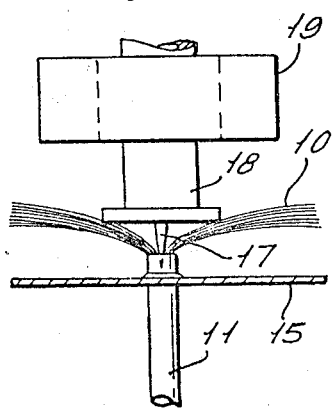
Figure 5D:
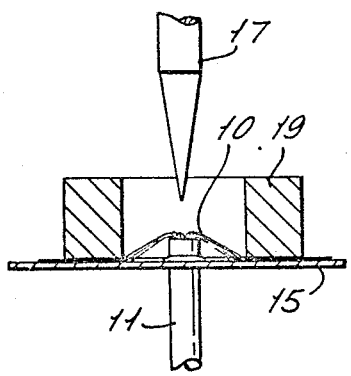
Figure 5E:
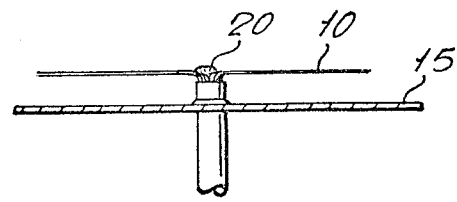

In the alternative method of manufacturing the display device which is shown in FIGS. 5a to 5e, the end of the remainder of the sheath 11, following stripping to expose a two inch length of fibres 10 at one end of the sheathed bundle, is secured in an apertured support plate 15 by means of a resin adhesive 16 (see FIG. 5a). A device comprising a pin-shaped element 17 slidable in a cover sleeve 18 is then inserted into the exposed projecting fibres 10, as shown in FIG. 5b. The device is then oscillated with a side-to-side and circular motion to spread the fibres evenly into a cup shape. The device is then lowered towards the bundle whereby the pin 17 recedes into the sleeve and the lower end of the sleeve itself presses the fibres into a saucer shape and then into a substantially plane disc shape (see FIG. 5c). Subsequently, a ring-shaped member 19 forming part of the device is lowered over the pin and cover sleeve to hold the fibres 10 in a spread rosette form, the pin and cover sleeve being withdrawn, as shown in FIG. 5d. A mass 20 of fast air-curing adhesive is then applied to the centre of the rosette to hold the fibres in place, and after curing of the adhesive the ring 19 is withdrawn (see FIG. 5e).

The fibre optic rosette may be utilised in the manner shown in FIGS. 2 and 4, for example to form wall panels or table tops. In this case, the support plate 15 can form the opaque backing plate against which the rosette is held by a transparent cover in the finished article.

Various modifications are possible within the scope of the invention.

We claim:

1. A method of producing a display device from a sheathed fibre optic bundle, which method comprises the following steps:
    stripping the sheath from the fibres in a portion of said bundle extending from one end thereof,
    twisting the fibres in said stripped portion together,
    bending the twisted fibres in said stripped portion at a point adjacent the remaining sheathed portion over an element heated sufficiently to give the fibres a permanent set bend after removal of said element, and
    giving said fibres a jolting movement to untwist them, whereby to cause the fibres to radiate from the end of the bundle substantially in a single plane, so as to form a rosette.

2. A method according to claim 1, wherein some of the radiating fibres are shortened to provide a double rosette.

3. A method of producing a display device from a sheathed fibre optic bundle, which method comprises the following steps:
    stripping the sheath from the fibres in a portion of said bundle extending from one end thereof,
    supporting said stripped portion by securing the end of the remaining sheathed portion adjacent said stripped portion in an apertured support,
    inserting a pin-shaped member into the fibres of said stripped portion and oscillating said pin-shaped member to spread the fibres of said stripped portion into a rosette lying substantially in a single plane against the apertured support,
    positioning a ring-shaped member around the pin-shaped member to hold the spread fibres against said apertured support,
    withdrawing said pin-shaped member,
    applying a fast air-curing adhesive to the fibres at the center of the rosette,
    curing said adhesive, and subsequently withdrawing said ring-shaped member.

* * * * *